(12) United States Patent
Zhao et al.

(10) Patent No.: US 8,838,706 B2
(45) Date of Patent: Sep. 16, 2014

(54) WIFI PROXIMITY MESSAGING (75) Inventors: Jun Zhao, Beijing (CN); Zhifeng Wang, Beijing (CN); Edward Un, Beijing (CN); Hua Li, Beijing (CN); Kaiyan Tian, Beijing (CN)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 12/822,276

(22) Filed: Jun. 24, 2010

(65) Prior Publication Data

US 2011/0320539 A1    Dec. 29, 2011

(51) Int. Cl.
| | |
|---|---|
| G06F 15/16 | (2006.01) |
| H04L 12/58 | (2006.01) |
| H04W 4/12 | (2009.01) |
| H04W 4/20 | (2009.01) |
| H04L 29/08 | (2006.01) |
| G06Q 30/02 | (2012.01) |
| H04W 4/02 | (2009.01) |
| H04L 12/18 | (2006.01) |
| H04W 88/08 | (2009.01) |
| H04W 28/06 | (2009.01) |

(52) U.S. Cl.
CPC .......... *H04W 4/206* (2013.01); *H04L 12/5895* (2013.01); *H04W 4/02* (2013.01); *H04W 4/12* (2013.01); *H04L 12/1854* (2013.01); *H04W 88/08* (2013.01); *H04L 51/38* (2013.01); *H04L 12/585* (2013.01); *H04W 28/06* (2013.01); *H04L 67/306* (2013.01); *G06Q 30/0251* (2013.01)
USPC ......................................... 709/206

(58) Field of Classification Search
USPC ......................................... 709/206
See application file for complete search history.

(56) References Cited

U.S. PATENT DOCUMENTS

| | | | |
|---|---|---|---|
| 7,607,015 | B2 | 10/2009 | Fascenda |
| 7,613,735 | B2 | 11/2009 | Yao |
| 7,647,048 | B2 | 1/2010 | Brok et al. |
| 2002/0173981 | A1 | 11/2002 | Stewart |
| 2002/0177435 | A1 | 11/2002 | Jenkins et al. |
| 2003/0144793 | A1* | 7/2003 | Melaku et al. ................ 701/209 |

(Continued)

FOREIGN PATENT DOCUMENTS

| | | | | |
|---|---|---|---|---|
| EP | 1156623 | A1 * | 11/2001 | ............. H04L 12/28 |
| JP | 2004258945 | A * | 9/2004 | |

(Continued)

OTHER PUBLICATIONS

PCT Search Report mailed Jan. 4, 2012 for PCT application No. PCT/US2011/041369, a counterpart foreign application of U.S. Appl. No. 12/822,276, 8 pages.

(Continued)

*Primary Examiner* — Kostas Katsikis (74) *Attorney, Agent, or Firm* — Carole Boelitz; Micky Minhas; Lee & Hayes PLLC (57) ABSTRACT

Techniques for utilizing APs and messaging service for delivering personalized message to individual mobile devices connected to internet through APs. In one example embodiment, for any particular wireless AP, a set of messages are identified based at least in part on attributes of the service subscriber associated with the particular wireless AP; and the set of messages are distributed to the particular wireless AP for further distribution to wireless devices in the vicinity of the particular wireless AP.

20 Claims, 11 Drawing Sheets

(56) References Cited

U.S. PATENT DOCUMENTS

| | | | |
|---|---|---|---|
| 2004/0029612 A1* | 2/2004 | Gorsuch | 455/552.1 |
| 2005/0177515 A1 | 8/2005 | Kalavade et al. | |
| 2005/0228750 A1* | 10/2005 | Olliphant et al. | 705/40 |
| 2006/0041515 A1 | 2/2006 | Wollmershauser | |
| 2006/0047829 A1* | 3/2006 | Acharya et al. | 709/229 |
| 2006/0047835 A1 | 3/2006 | Greaux | |
| 2006/0142034 A1* | 6/2006 | Wentink et al. | 455/515 |
| 2006/0236105 A1 | 10/2006 | Brok et al. | |
| 2006/0242010 A1* | 10/2006 | Crolley | 705/14 |
| 2006/0271425 A1 | 11/2006 | Goodman et al. | |
| 2007/0036119 A1 | 2/2007 | Haddad et al. | |
| 2007/0180499 A1 | 8/2007 | Van Bemmel | |
| 2007/0242643 A1 | 10/2007 | Chandra et al. | |
| 2007/0249403 A1 | 10/2007 | Gao et al. | |
| 2008/0240016 A1 | 10/2008 | Cai et al. | |
| 2009/0029728 A1 | 1/2009 | Shen et al. | |
| 2009/0048915 A1* | 2/2009 | Chan | 705/14 |
| 2009/0093232 A1* | 4/2009 | Gupta et al. | 455/410 |
| 2009/0245133 A1 | 10/2009 | Gupta et al. | |
| 2009/0257376 A1 | 10/2009 | Dhanapal et al. | |
| 2009/0288012 A1* | 11/2009 | Hertel et al. | 715/738 |
| 2009/0299788 A1 | 12/2009 | Huber et al. | |
| 2009/0300722 A1 | 12/2009 | Haverinen et al. | |
| 2009/0313113 A1* | 12/2009 | Dye et al. | 705/14.42 |
| 2010/0275249 A1 | 10/2010 | McCann et al. | |
| 2011/0002243 A1* | 1/2011 | Sherman et al. | 370/280 |
| 2011/0070901 A1* | 3/2011 | Alward | 455/466 |
| 2011/0153756 A1* | 6/2011 | Angle et al. | 709/206 |
| 2011/0158127 A1 | 6/2011 | Duo et al. | |
| 2011/0320539 A1 | 12/2011 | Zhao et al. | |
| 2012/0311328 A1 | 12/2012 | Wang et al. | |

FOREIGN PATENT DOCUMENTS

| | | |
|---|---|---|
| KR | 20070013936 | 1/2007 |
| KR | 20070087654 | 8/2007 |
| WO | WO 2008157743 A2 * | 12/2008 |

OTHER PUBLICATIONS

Papadiamantopoulos, "Delivering Personalized and Location Aware Advertisements to Mobile Users over Wi-Fi or Bluetooth Wireless Links", Jul. 2009, Athen Information Technology Center of excellence for research and grauate education, pp. 1-33.

Xia et al, "Virtual Prepaid Tokens for Wi Fi Hotspot Access", Proc 29th Annual IEEE Intl Conf on Local Computer Networks, Nov. 2004, 8 pgs.

* cited by examiner

Fig. 13

WIFI PROXIMITY MESSAGING

BACKGROUND

As personal mobile devices have become nearly ubiquitous, users have come to rely on them for many details of their lives. Many such devices are location-aware, meaning that they are able to determine and report their locations to service providers. This allows the service providers to customize information provided to particular users based on the locations of those users. For example, when a user is looking for a restaurant, a service can provide information about restaurants that are nearby the user. Advertising and other types of messaging can also be provided based on location.

However, it can be difficult to select appropriately targeted advertising and other content based solely on location. Additional methods of determining user interests would therefore be valuable to advertising, messaging, and notification providers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

This document describes a system for providing targeted messages from a messaging service provider through a network of wireless access points to mobile devices when they're adjacent to a respective assess point. Targeted messages can be personalized in accordance with user characteristics and user preference of the mobile device. User of mobile devices can also authenticate such messaging service and filter out unwanted messages. This document also describes a protocol for probe request and response between mobile devices and access points to support two way communications. This document enables delivering individual customized information to a mobile device even if the mobile device is not connected with the access point.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
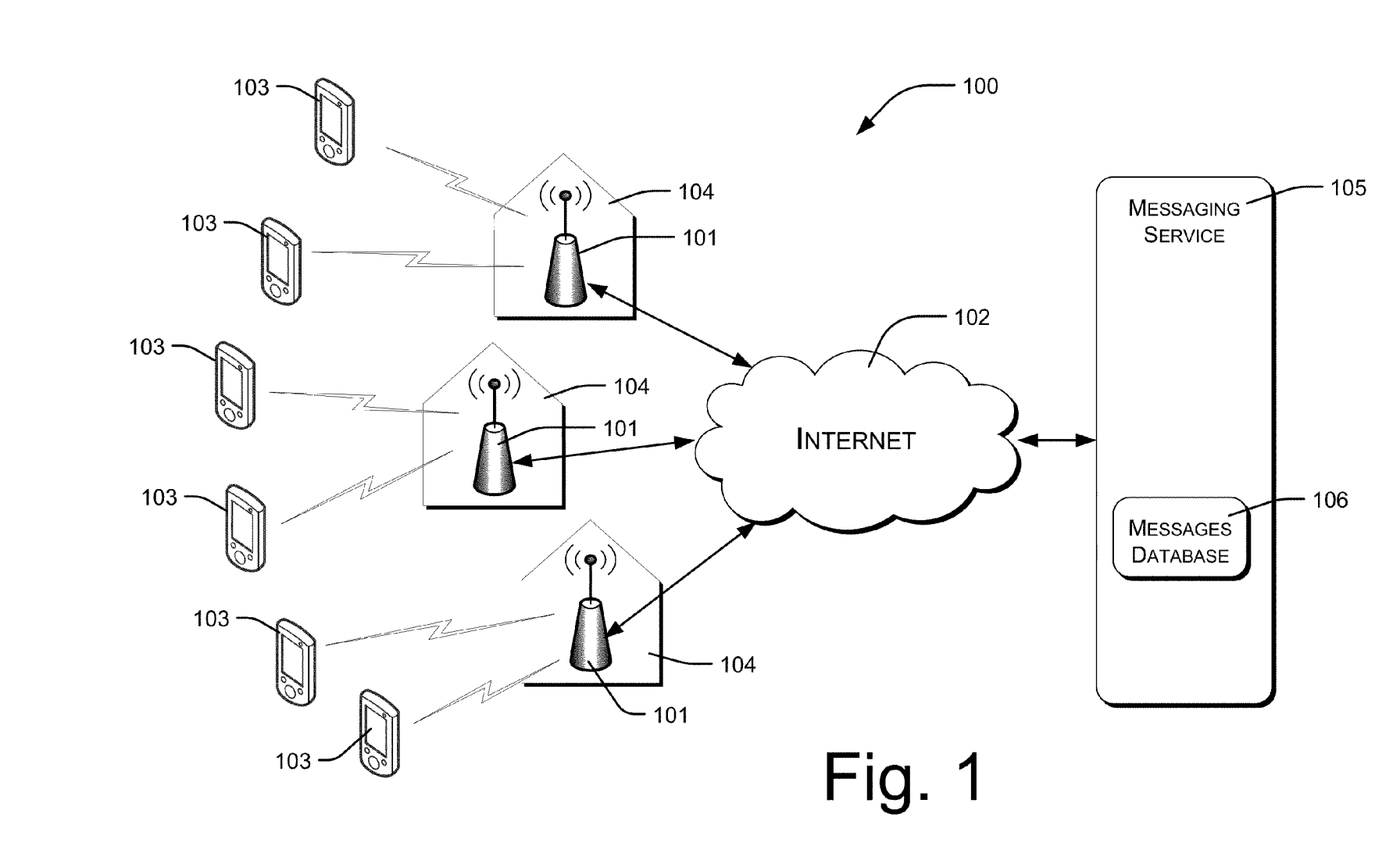
FIG. 1 shows an architecture in which APs are connected through unspecified means to common network or Internet.
Figure 2:
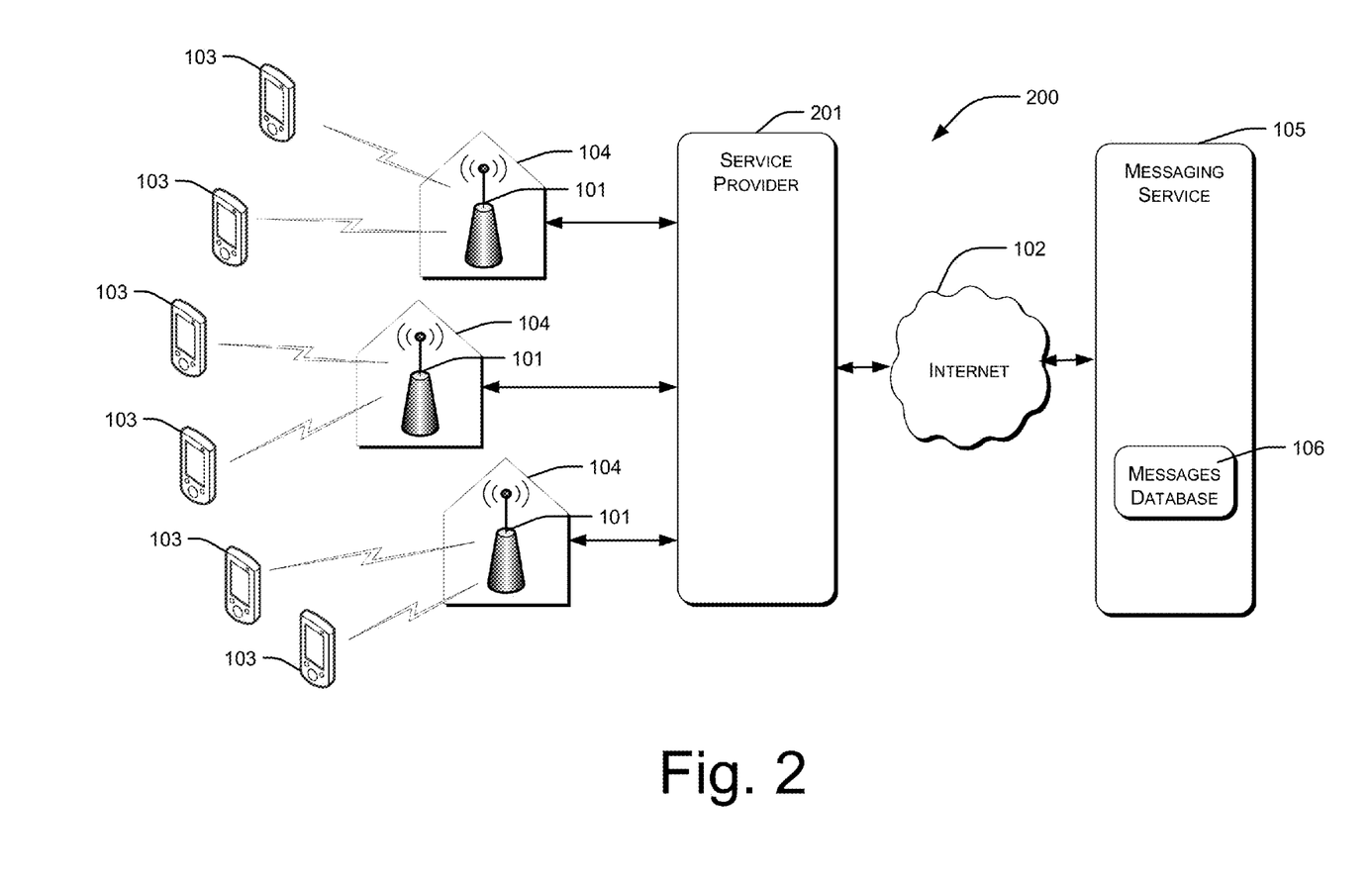
FIG. 2 shows an architecture in which access points are connected to common network through a common service provider.
Figure 3:
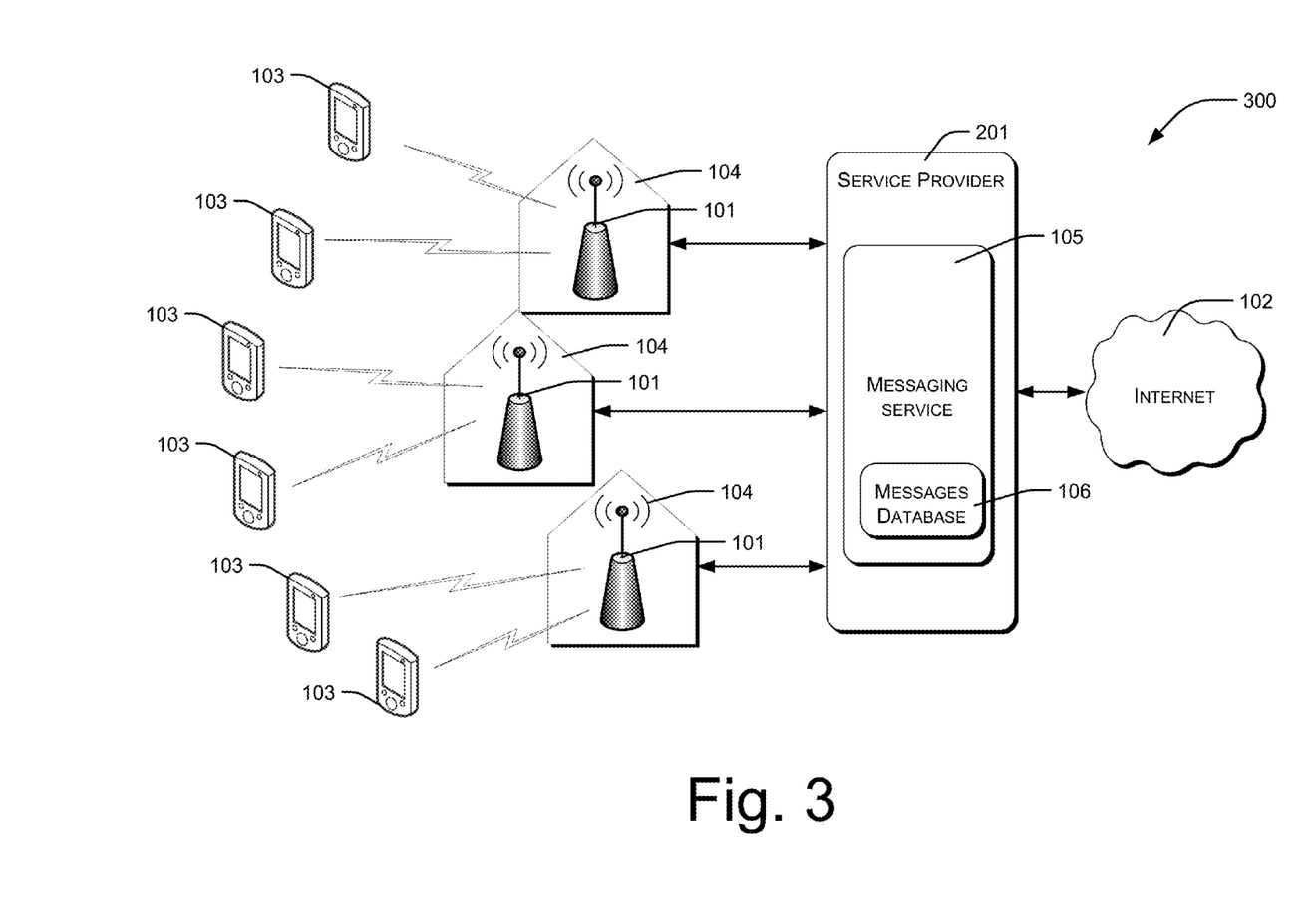
FIG. 3 shows an architecture in which access points are connected through common network through service provider.

FIGS. 1-3 show examples of systems and architectures that can be utilized to provide targeted messaging to mobile device users. Each system includes a network of WIFI™ access points (APs) 101 connected through various means to a common network 102 such as the Internet. The systems also include a plurality of mobile devices 103 having wireless communications capabilities for communications with and through one or more of APs 101.

Individual APs 101 are typically located in homes, businesses, or other entities 104, at different geographic locations. Many APs are secured so that only members of the entities are allowed to connect through the APs associated with those entities. On the other hand, APs might be deliberately unsecured in order to allow visitors or patrons to utilize the APs and to thereby access the Internet while on the premises of the entity. Still other APs might allow visitors or patrons to subscribe, sometimes for a fee, for Internet access.

APs 101 use WIFI™ and other networking technologies to act as gateways or ports to common network 102. In many embodiments, APs 101 are configured to connect to common network 102 through a data or Internet service provider. The individual APs of the illustrated networks might all be provided and/or provisioned by a common Internet service provider, or they might utilize the services of a variety of different Internet service providers.

Mobile devices 103 can comprise various different types of computing devices such as mobile telephones, cellular phones, voice-over-IP (VOIP) phones, notebook computers, tablet computers, smartphones, personal digital assistants (PDAs), personal media devices/players, and other computing devices. Mobile devices 103 use WIFI™ and other networking technologies and protocols to connect and communicate with APs 101. Examples of current technologies, formats, and protocols used for this purpose are described by a standard known as IEEE 802.11. There are numerous variants of this standard.

In addition to the components described above, system 100 has one or more messaging servers or services 105. Messaging service 105 is connected through Internet 102 to communicate with APs 101. Messaging service 105 maintains a store or database of messages 106 that can be targeted to particular mobile devices 103 by means of various strategies that will described in more detail below.

In operation, a mobile device 103 is configured to request and/or receive targeted messaging from a nearby AP 101. In response, the nearby AP 101 provides a message that is selected from messaging database 106 based on characteristics, preferences, events, or specific requests of the user of mobile device 103. In some embodiments, mobile device 103 sends a WIFI™ probe request to AP 101, indicating presence or requesting a message. In response, AP 101 returns a message that has been obtained from messaging service 105. The message can be returned through a WIFI™ probe response frame or a WIFI™ beacon frame.

These communications can be performed without the need for mobile device 103 to join AP 101 through a formal wireless network connection. Thus, mobile device 103 need not join any particular wireless network to gain the benefits of the messaging techniques described herein, and can conceivably receive messages from any nearby access point regardless of access rights.

In some cases, messages can serve as notifications that further actions may be needed by the user. In these situations, the user may choose to formally join a wireless network in order to perform the indicated further actions. For example, the user may want to connect to an instant messaging service or to an email service to retrieve messages. As another example, a notification-type message might indicate some type of event or news item that the user might wish to view online.

In other cases, messages may be offers or advertisements targeted in some way to interests or assumed interests of the user of mobile device 103. Such offers or advertisements may be solicited or unsolicited.

In still other cases, messages may contain notifications, messages, or information that is particularly requested by user, and in some cases may be location-dependent. For example, a user might request information about nearby restaurants, and such information might be supplied by AP 101 in response to a specific request. In situations like this, location might be inferred by referencing information about the particular access point 101 which received the user request.

FIG. 1 shows an architecture 100 in which APs 101 are connected through unspecified means to common network or Internet 102. The connection to common network 102 may be through direct connection, through some type of relayed or indirect connection, or through any other means. Messaging service 105 is similarly connected to common network 102, allowing networked communications between access points 101 and messaging service 105.

FIG. 2 shows an architecture 200 in which access points 101 are connected to common network 102 through a common service provider 201. Service provider 201 can comprise an Internet provider through which individual consumers obtain Internet data service. Access points 101 in this scenario are associated with individual service subscribers of Internet service provider 201 and/or of messaging service 105.

FIG. 3 shows an architecture 300 in which access points 101 are connected through common network 102 through service provider 201. In this example, however, messaging service 105 is supplied by and/or is part of service provider 201.

In FIGS. 2 and 3, service provider 201 can comprise an Internet provider through which individual consumers obtain Internet data service. In such an environment, service provider 201 might provide APs 101 to individual service subscribers such as those represented by entities 104, in order to provide Internet connectivity to those homes and businesses. Being provided by service provider 401, APs 101 can be customized and/or configured to work with the advertising and messaging services described herein.

In some cases, messaging service 105 might be provided by service provider 201, and might be configured to communicate only with those APs 101 that have been provided or provisioned by service provider 201, or that rely on service provider 201 for Internet connectivity. In other cases, messaging service 105 might be configured to communicate with APs provided or configured by messaging service 105, or with APs that have been configured by their administrators to utilize the services of messaging service 105.

Although FIGS. 1-3 show particular examples of suitable architectures for implementing the messaging techniques described herein, other architectures and arrangements are also possible, and may be desirable in various situations.

General Messaging

Figure 4:
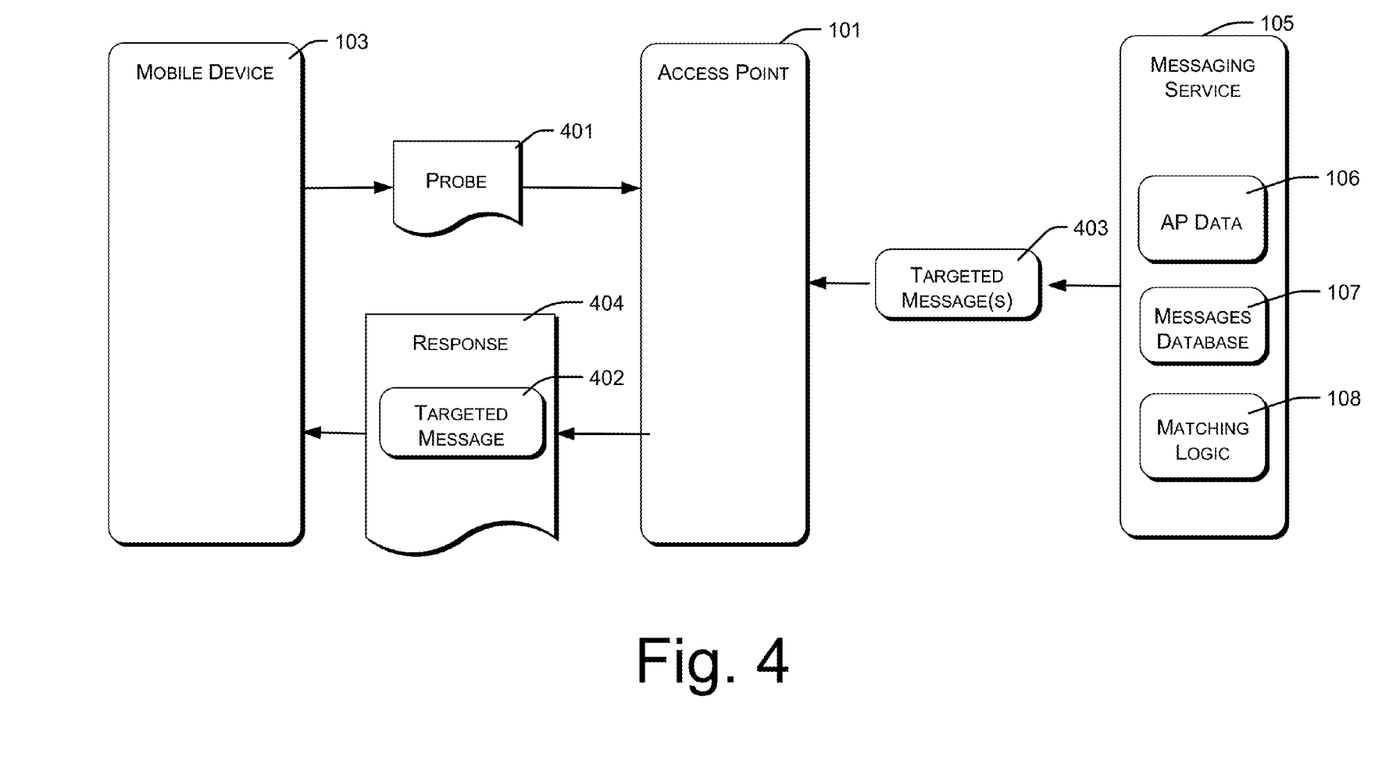
FIG. 4 illustrates general techniques for providing targeted or requested messages to a particular mobile wireless device.
Figure 5:
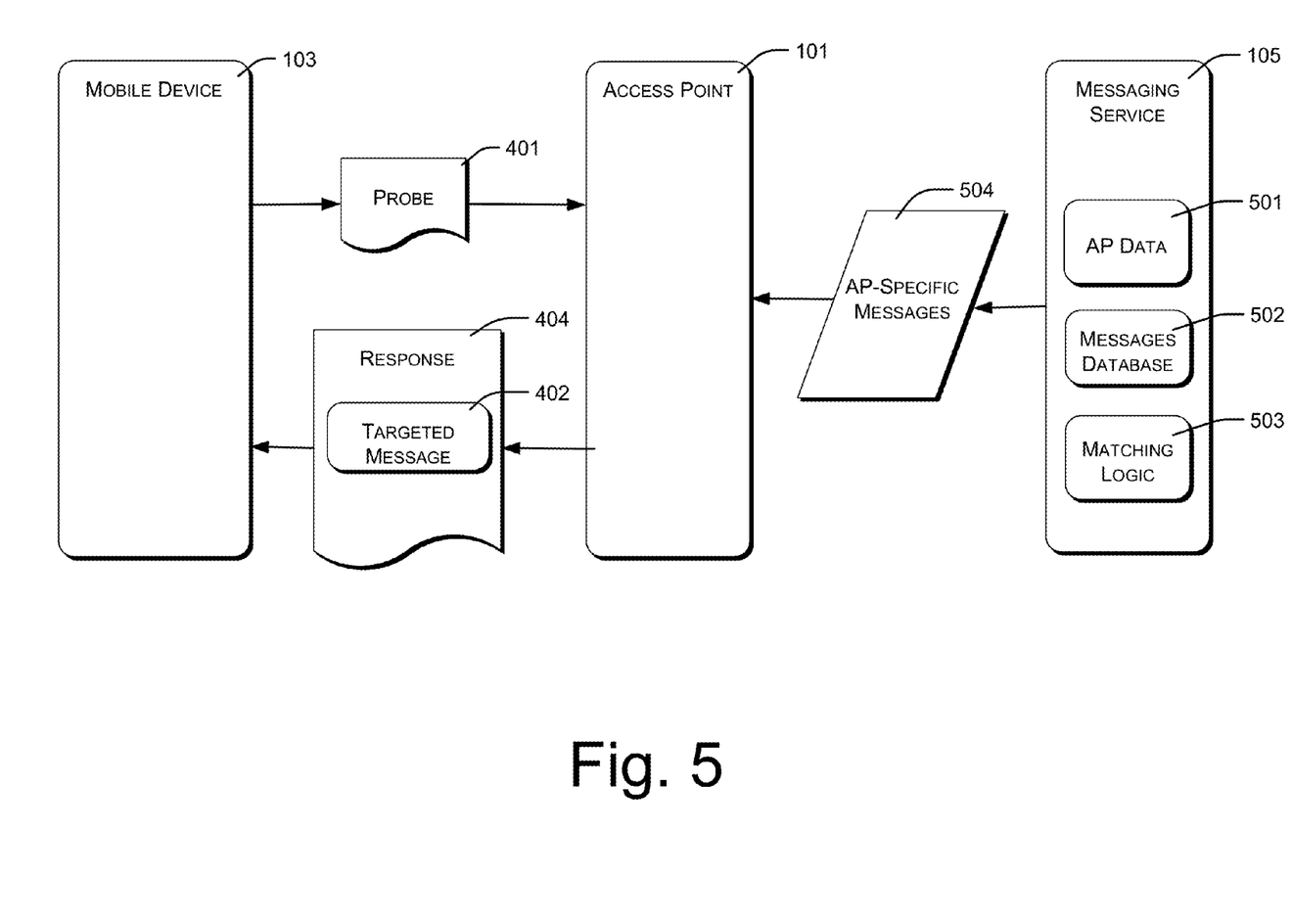
FIG. 5 illustrates a way in which messages provided to mobile device can be targeted to a user of mobile device based on assumed or inferred interests of the user.
Figure 6:
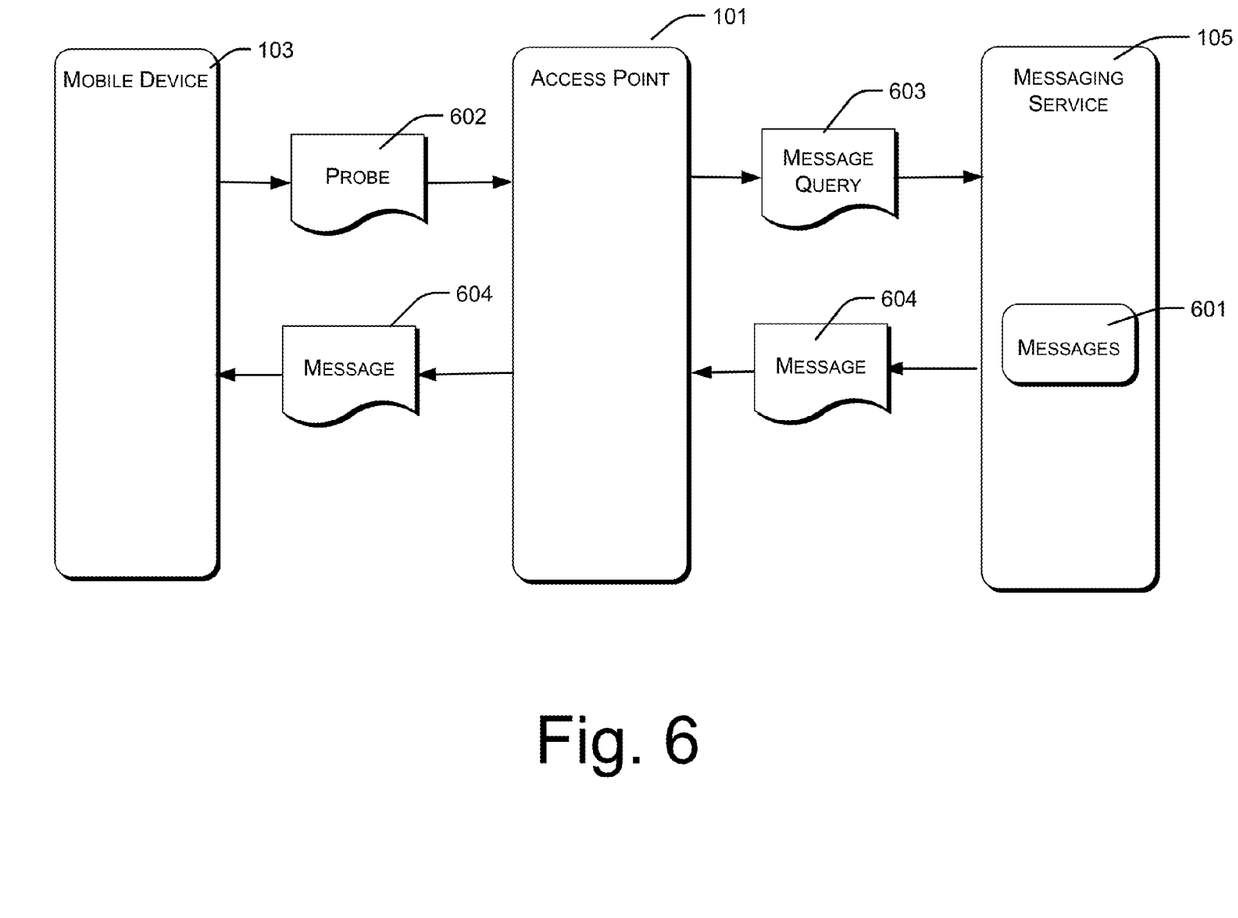
FIG. 6 illustrates a way in which messages provided to mobile device 103 can be targeted based on expressed preferences or interests of a user.

FIGS. 4-6 illustrate various applications of messaging techniques that can be used in conjunction with the architectures described above with reference to FIGS. 1-3. For clarity, FIGS. 4-6 show only the those components most relevant to the discussion; in particular, a single mobile device 103, a single access point 101, and messaging service 105. It should be understood assumed that these components operate in the larger environment depicted by FIGS. 1-3.

FIG. 4 illustrates general techniques for providing targeted or requested messages to a particular mobile wireless device 103. Access point 101 periodically sends a beacon message or frame in accordance with IEEE 802.11 standards and conventions. The beacon message is intended to advertise the presence of access point 101 to any devices within its reception range.

Mobile device 103 receives the beacon message from access point 101 and becomes aware of its presence. Mobile device 103 is configured to periodically send a probe request to access point 101. A probe request is a communication that can be sent to an access point to determine information about the access point. Typically, a probe request is used to determine capabilities and availability of the access point for subsequently joining the access point or its local network. As a specific example of a probe request, the IEEE 802.11 standard defines a probe request frame that can be broadcast by a potential mobile client to a nearby access point. In the particular embodiment described herein, AP 101 sends a probe request frame to access point 101. The probe request frame 401 contains information indicating a request for a targeted message. More specifically, probe request frame 401 contains an information element (IE) that specifies the request for a targeted message. More details regarding the format of the information element will be provided below.

In response to receiving probe request 401, access point 101 obtains and/or determines an appropriately targeted message 402 that will be provided to the requesting mobile device 103. Generally, targeted message 402 is obtained from messaging service 105, either ahead of time in preparation for probe requests such as this, or in direct response to probe request 401. FIG. 4 shows messaging service 105 providing potential targeted messages 403 to access point 101, which include targeted message 402.

Targeted message 402 can be returned or provided to mobile device 103 by way of an information element embedded in a probe response 404 such as a probe response frame. IEEE 802.11 defines a probe response frame as a way for an access point to return information to a requesting device regarding capabilities and availability of the access point. Probe response 404 can indicate targeted message 402 either by inclusion or by reference.

Alternatively, response 404 may comprise a beacon or beacon frame as defined by IEEE 802.11. A beacon frame is similar to a probe response frame, except that it is broadcast generally, at intervals, without specific request, in the form of a probe request frame. Again, response 404 may indicate targeted message 402 either by inclusion or by reference, as part of an information element. When using a beacon frame, it may be desirable to include information in the beacon frame indicating the particular client for which its message is intended.

Note that the communications illustrated by FIG. 4 can take place without mobile device 103 joining the network of access point 101. Thus, mobile device 103 can roam among and interact with various different APs 101, regardless of whether mobile device 103 has access rights to those APs.

Location-Based Messaging

FIG. 5 illustrates a way in which messages provided to mobile device 103 can be targeted to a user of mobile device 103 based on assumed or inferred interests of the user.

In this embodiment, messaging service 105 maintains AP data 501, which indicates various information about each access point 101 and about each home or business 104 with which the access point is associated and within which the access point is located. Such information can include the name of the entity and the physical location or geographical coordinates of the entity. Access point data 106 can also include the type of business, the nature of goods or services sold and/or serviced by the entity, the types or characteristics of customers served by the entity, and/or various interests or characteristics of known users of access point 101.

Messaging service 105 also maintains a store or database of messages or content 502 to be provided to mobile devices 103. Messages 502 can comprise information about various available merchant services, special offers, educational materials, items of interest, and other information that can be generally referred to as advertisements. Various advertisers or other parties may provide messages 502 to messaging service 105. In some scenarios, advertisers may pay for inclusion and distribution of their messages by messaging service 105.

The messages can include descriptive tags or data indicating information that allows the messages to be correlated with different entities 104 based on characteristics of the homes or businesses as indicated by AP data 501. Examples of such correlation will be described in more detail below.

Messaging service 105 also has matching algorithms or logic 503 that compare AP data 501 to the descriptive tags of messages 502 in order to find messages that might be appropriate for the users of mobile devices 103 in the vicinity of particular APs 101. In particular, for each AP 101, the matching logic identifies a set of messages 504, from messages 503, based at least in part on attributes of the home, business, or other entity that is providing, hosting, or operating AP 101. The sets of messages are identified in accordance with the tags or other information associated with the messages in order to match the subject matter of the messages with characteristics of the entities associated with the respective APs 101.

In operation, a mobile device 103 is configured to request and/or receive targeted messaging from a nearby access point 101 as already described. In response, the nearby AP 101 provides one or more messages from the set of messages that has been identified by matching logic 503 as correlating with the entity associated with the nearby AP 101 and that has been previously provided by messaging service 105 to access point 101.

For example, suppose access point 101 is located in a high-end café. Matching logic 503 may select a set of AP-specific message 504 that might be particularly appropriate for the types of people that typically visit this type of establishment. This selected AP-specific messages are delivered to access point 101, which in turn delivers them individually to nearby mobile devices 103 upon request.

Messaging service 105 may provide different levels of matching for different advertisers or message providers, and may vary advertising fees accordingly. For a particular advertisement, for example, matching logic 503 may determine an appropriate group of access points 101 using the following logic. First, matching logic 503 might select those access points operated by or within the businesses of the actual advertiser. For example, if an advertisement relates to Café A, the advertisement will be included in the set of AP-specific messages 504 provided to the APs 101 within Café A.

Second, perhaps for a higher fee, matching logic 503 might choose access points 101 close to the business owner's stores, which could be other access points 101 in the same building or nearby buildings. One example is to use longitude/latitude to determine other access points 101 adjacent to the specific access point 101 where the business owner is located. Another example is to use longitude/latitude to determine other access points 101 adjacent to a longitude/latitude of the business owner's address. It is understood that a physical location of access point 101 and the business owner's address may not be the same even though access point 101 provides service to home or business 104. A selection of nearby access points 101 may or may not exclude direct competitors to avoid unnecessary conflicts.

Third, again perhaps for a higher fee by messaging service 105, matching logic 503 might select a large set of access points across different locations. For example, when the business owner sponsoring the advertisement is a chain store, matching logic 503 might select access points 101 at or close to all stores of the chain, regardless of city, state, or country. Another example is that the business owner is a merchant and wants to send its promotion, such as a new luxury watch, to a whole town, city, state, or country. Matching logic 503 then selects corresponding access points 101 across such a region. Matching logic 105 can also choose access points 101 where business owners or entities have a correlation probability with targeted messages 201 to more accurately target potential customers. For example, after analysis or based on choices of the business owner, matching logic 108 might choose access points 101 close to luxury car service stores, because customers of these two items or services often overlap.

The above examples are for illustrative purpose only. It is appreciated that there are many varieties of logic that might be implemented by matching logic 503 for choosing access points 101 that are appropriate for a particular advertisement. Furthermore, matching logic 503 may utilize data gathered online or offline, or from a third party source, to increase accuracy and dynamically updating selection of access points 101.

Personalized Messaging

FIG. 6 illustrates a way in which messages provided to mobile device 103 can be targeted based on expressed preferences or interests of a user. In this example, messaging service 105 maintains a message database 601 containing messages for distribution to wireless devices 103 through access points 101. Messages 601 can comprise advertising or similar information, or can contain descriptive information, offers, invitations, etc.

The user of mobile device 103 specifies certain interests or requests. This may be accomplished with an application or other interface on mobile device 103. In addition, such an application might specify informational requests itself, without user participation, to obtain information from messaging service 105 that is relevant to the services provided or functions performed by the application.

Alternatively, a user might specify interests, characteristics, and/or profile information on a website that is accessible to messaging service 105, or on a website operated by messaging service 105.

Mobile device 103 then sends a probe request 602 to access point 101, using a mechanism such as a probe request frame as described above. Probe request 602 specifies interests, characteristics, requests, and/or profile information of the user of mobile device 103. This information can be specified explicitly or implicitly, by inclusion or by reference. Thus, probe request 602 may specify user identity information, which messaging service 105 may reference to lookup previously stored information about the user or the user's preferences.

Access point 101 receives probe request 602 and in response submits a message query 603 to messaging service 105 to obtain a message for delivery to mobile device 103. Messaging service 105 receives message query 603 and refers to user information to determine an appropriate message to return to mobile device 103. The user information may be included in query 103 in the form of explicit information or requests. Alternatively, query 103 may simply identify the user or a unique identifier of mobile device 103, in which case messaging service 105 refers to previously stored data associated with the user or device to determine one or more messages that should be returned to the user.

A selected message 604 from messages 601 is returned to access point 101. Access point 101 then sends message 604 to mobile device 103. In the particular example described in FIG. 6, message 604 is included in or indicated by a probe response, as described above. Alternatively, message 604 might be returned as part of a beacon frame, along with information allowing mobile device 103 to determine that a particular message is directed to that mobile device 103.

Note that the probe response may not necessarily be in direct response to the original probe request 602. Instead, an initial probe response may indicate to mobile device 103 that it should perform another probe request to retrieve the requested message, or may indicate that the desired message will be included in a subsequent beacon frame.

Notification Services

The mechanisms described with reference to FIG. 6 may be used to provide event notification services to mobile devices 103. In particular, a mobile device 103 may send a probe request 602 that indicates presence of mobile device 103 near access point 101. Probe request 602 may indicate the identity of the mobile device 103 or its user, and may additionally indicate particular types of notifications that the user would like to receive.

Messages database 601 can be a notification queue, which can be used to accumulate notifications or notification messages that are to be provided to various mobile devices 103. Notifications can be generated by the messaging service itself, or provided to messaging service 105 by other entities desiring to send notifications to mobile devices 103.

In response to receiving probe request 602, AP 101 queries messaging service 105, in message query 603, for any messages or notifications that are pending in messages database 601 for mobile device 103. Probe request 602 may specify certain actions, which are also provided in query 603 to messaging service 105.

In response to receiving message query 603, messaging service 105 examines its message database 601 such as the notification queue to locate any pending messages or notifications intended for mobile device 103, and transmit any such messages or notifications 604 to AP 101. AP 101 receives the message 604 and provides them to mobile device 103 in a probe response, probe response frame, or beacon frame, as described above. This mechanism allows unlimited types of notifications to be provided to a mobile device as it roams among various access points, without requiring the mobile device to actually join the access points or their local networks. Messaging service 105 can act as a notification clearing house, receiving notifications from different entities and forwarding them to different mobile devices as those mobile devices enter into the coverage ranges of different access points.

Protocols

Although other mechanisms can be used, the embodiments described herein utilize IEEE 802.11 probe request, probe response, and beacon frames for messaging. These frames can contain single or multiple proprietary information elements that carry discovery information pertaining to the services that the devices offer. Proprietary information elements are identified by their Element IDs and are further distinguished by an IEEE-administered Organizationally Unique Identifier (OUI) and a predefined OUI Type value.

The messages described above can be embedded in probe request, probe response, and beacon frames as information elements having a predefined OUI Type within a particular organization's OUI. Each information element can be formatted to have a version number field, an action type field, an action provider field, and a data or content field. The version number can be used to specify different revisions of the messaging protocol. The action type field can be used to request or provide a particular type of action. Action type values can be pre-coded to different actions, so that particular values indicate particular actions. For example, a particular value might indicate a request for coupon information. Another value might request registration for certain notifications, such as instant messaging, online shopping promotions, traffic notifications, etc.

The action provider field can be used to indicate a particular service provider intended to service the request. This allows for the existence of multiple messaging providers, and clients can specify which service providers they will use.

The data field can include messages, notifications, links or references to messages or notifications, and other types of information to be exchanged between mobile devices 103, access points 101, and messaging provider 105.

The fields above can alternatively be embedded within the Microsoft Proximity Service Discovery protocol (MS-PSD), which is an open specification published by Microsoft Corporation.

Message payloads can be encrypted in certain situations where privacy is important. Cryptographic techniques can also be used to authenticate messaging providers and to validate that particular messages have originated from authorized messaging providers. For example, a messaging provider can encrypt its messages with a private key, and mobile device 103 can decrypt the messages with the corresponding public key, which is in the public domain. Mobile device 103 can identify the sender based on the OUI of the received frame's information element. WIFI™ clients typically cache the public key of the sender for subsequent use. Alternatively, the public key can be embedded in certain frames for use by clients that do not cache public keys. This can be done through multiple layers of encryption: the outer layer can be encrypted by the private key of a widely known organization whose public key is widely known. The inner layer can contain the public key of the sender. This enables offline decryption and prevents identity misrepresentation.

Mobile device 103 can discard any message that is not sent from an authorized sender. Furthermore, false information and representations can be recorded and/or reported by mobile devices 103 and/or APs 101. A messaging provider with a high volume of misbehaviors will develop a bad reputation, and end users may choose to ignore or screen messages from that provider. This type of ecosystem encourages trusted and valuable information sharing, and discourages false or overwhelming information loading.

Mobile Device Configuration

Figure 7:
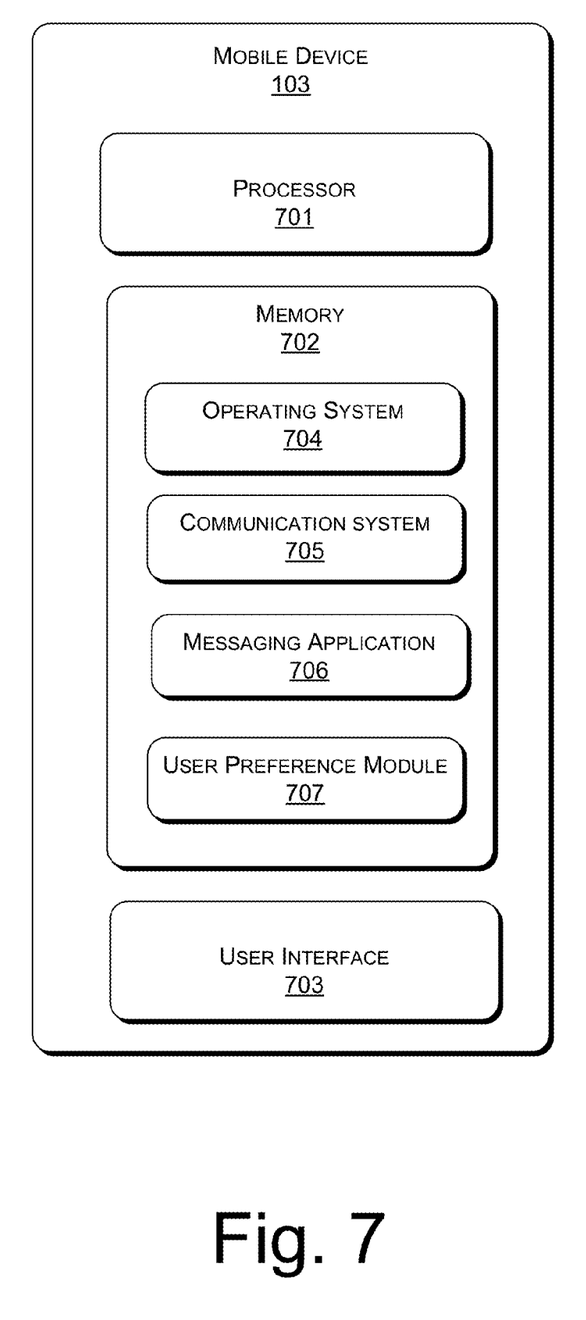
FIG. 7 shows relevant components of a mobile device.

FIG. 7 shows relevant components of a mobile device 103 in accordance with an example embodiment. In this illustrative case, mobile device 103 may include one or more processors 701, a memory 702, and a user interface 703. Memory 702 may comprise a variety of computer readable storage media. Such media can be any available media including volatile and non-volatile storage media, removable and non-removable media, local media, remote media, optical memory, magnetic memory, electronic memory, etc. Generally, memory 702 contains computer-readable instructions that are accessible and executable by processor 701 to implement the functionality described herein. In some embodiments, the instructions may comprise an operating system 704, a communication system 705, a messaging application 706, and a user preference module 707. A user of mobile device 103 can interact with these elements through user interface 703, which might be formed by a display screen and associated keypad, by a touch-sensitive display screen, or other means.

Communication system 705 can be part of operating system 704 and may implement standard wireless communication protocols such as those defined by the previously mentioned IEEE 802.11 standard.

Messaging application 706 works in conjunction with communications system 705 to receive and/or request messages from messaging service 105, through access points 101, as described herein.

User preference module 707 maintains user preferences relating to subject matter or characteristics of targeted messages that the user wishes to include and/or exclude. For example, user preference module 707 can include a preference whether to receive a particular type of message, a preference whether to request a certain type of message, a preference regarding the type of message in which user of mobile device might be interested, a preference regarding the types of messages in which the user is not interested, etc. All of these preferences can be predefined by a seller of mobile device 103 or modified by user of mobile device 103.

User preference module 707 can also perform filtering on any received message, so that mobile device 103 displays only those received messages matching the preferences specified by the user.

AP Configuration

Figure 8:
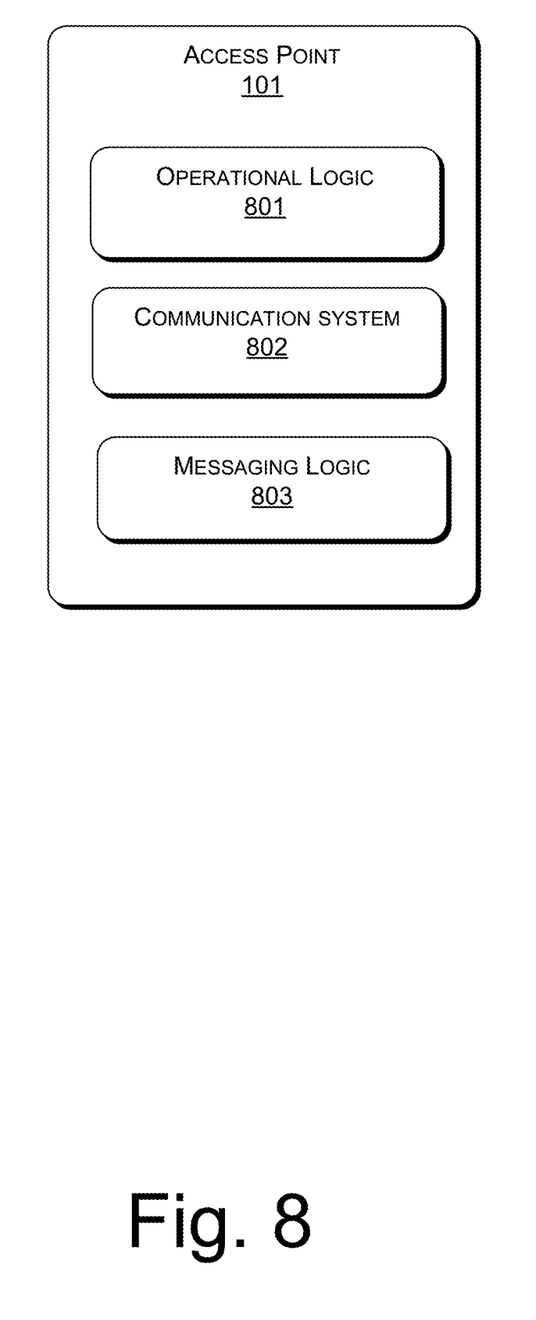
FIG. 8 illustrates relevant components of an example access point.

FIG. 8 illustrates relevant components of an example access point 101. In this example, access point 101 comprises operational logic 801, a communication system 802, and messaging logic 803. Operational logic 801 comprises circuitry, one or more processors, and/or memory, all configured or programmed to implement the functionality of access point 101, including the messaging techniques described herein and other functions that are normally provided by a wireless access point. Messaging logic 803, which may be implemented by operational logic 801, is configured to communicate with nearby mobile devices 103, and to identify one or more messages for delivery to the nearby mobile devices. In one embodiment, the delivered message may be a randomly selected one or more of the targeted messages that have been provided by messaging service 105 to access point 101. In this case, access point 101 simply forwards or relays one of the targeted messages to mobile device 103. In another embodiment, access point 101 is configured to receive user preferences from mobile device 103, and the delivered message is one that is selected from the target messages based on the user preferences. Alternatively, user preferences can be enforced by filtering at mobile device 103 itself, or by matching logic 108 of messaging service 105. Communication system 802 is configured to receive targeted messages from messaging service 105 and transmit those messages to mobile devices 103.

Methodological Aspects

Figure 9:
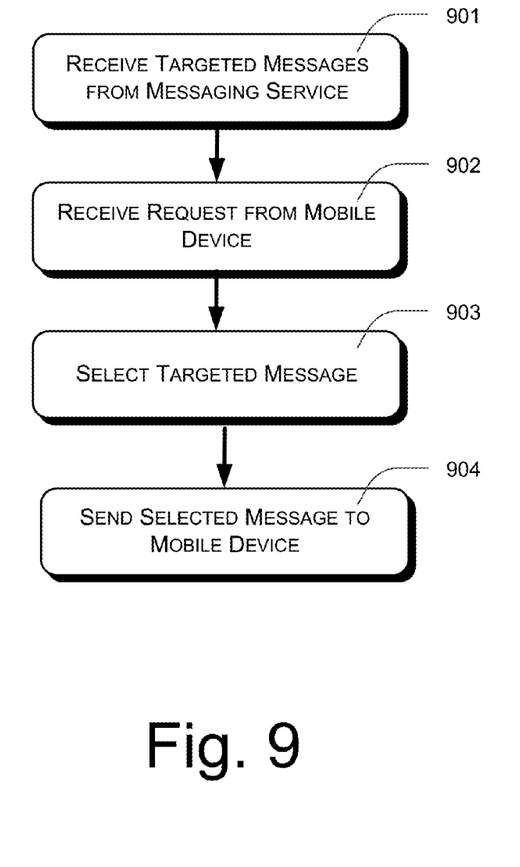
FIG. 9 illustrates actions performed by an AP.

FIG. 9 illustrates actions performed by an AP 101 in accordance with the techniques described above. An action 901 comprises receiving a set of targeted messages, selected based on characteristics of an entity or business within which AP 101 operates. An action 902 comprises receiving a request from a mobile device 103 for targeted messaging. The request can come in the form of a probe request frame, as described above, without requiring mobile device 103 to join AP 101 or to join the local network of AP 101.

In response to receiving the request, AP 101 performs an action 903 comprising selecting one or more of the messages received in action 901. One or more messages can be selected randomly, or in some cases might be selected based on criteria or actions specified in the request.

An action 904 comprises sending the selected one or more messages to mobile device 103. As described above, this may be performed using a probe response frame or a beacon frame.

Figure 10:
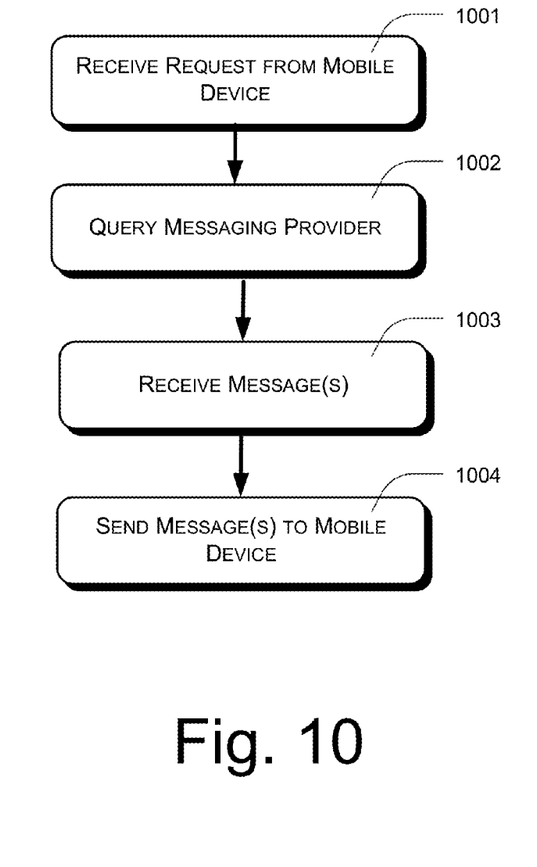
FIG. 10 illustrates actions performed by AP in a different scenario where personalized messaging is provided to mobile device

FIG. 10 illustrates actions performed by AP 101 in a different scenario where personalized messaging is provided to mobile device 103. In this scenario, an action 1001 comprises receiving a request from mobile device 103 for one or more targeted messages, services, and/or notifications. The request can be embedded as part of an information element in a probe request or probe request frame. An action 1002 comprises querying a messaging provider with the received request for messages, services, and/or notifications. In response, the messaging provider sends one or more messages, and in an action 1003, AP 101 receives the one or more messages from messaging provider 105. An action 1004 comprises sending the one or more messages to mobile device 101. The messages can be embedded as part of an information element as already described.

Figure 11:
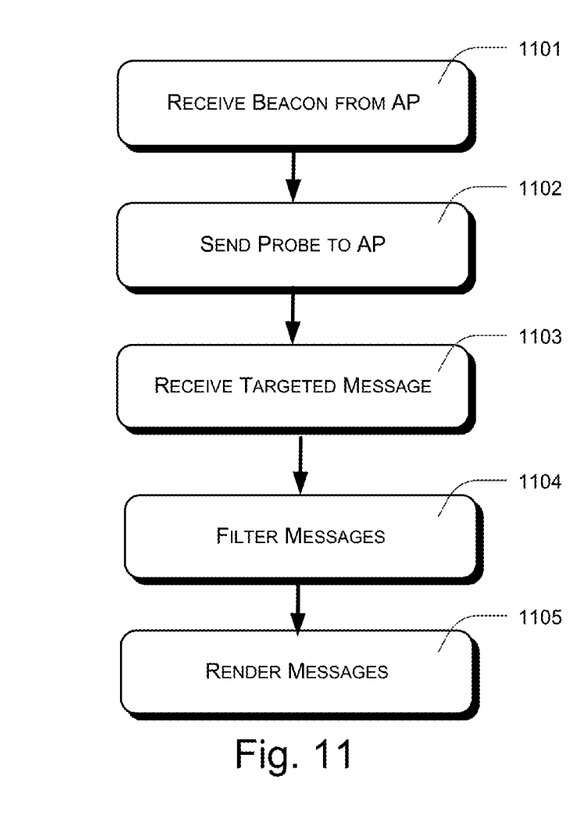
FIG. 11 illustrates actions performed by a mobile device.

FIG. 11 illustrates actions performed by a mobile device 103 in accordance with the techniques described above. An action 1101 comprises receiving a beacon frame or other notification of a nearby AP 101. An action 1102 comprises sending a probe request frame to the AP 101, containing an information element indicating a request for a targeted message. An action 1103 comprises receiving a targeted message from AP 101, which may be embedded as an information element in a probe response or beacon frame. The message may be specified by inclusion of the message content itself, or by reference to a location or address where the message content may be found.

An optional action 1104 comprises filtering received targeted messages based on criteria set by a user of mobile device 103.

Figure 12:
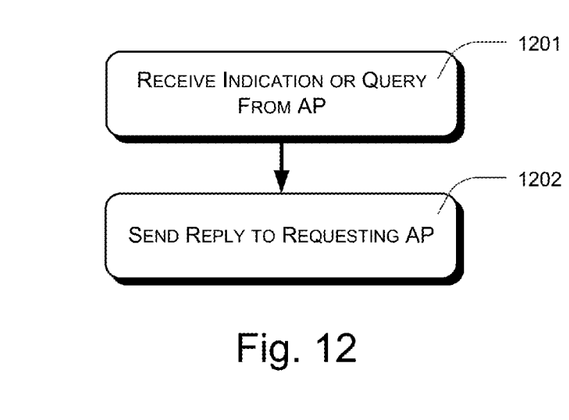
FIG. 12 illustrates actions that can be performed in a first embodiment by messaging service in response to requests from one or more of APs.

FIG. 12 illustrates actions that can be performed in a first embodiment by messaging service 105 in response to requests from one or more of APs 101. An action 1201 comprises receiving an indication or query from an AP 101. The query may identify a particular mobile device or its user, a particular AP, the service subscriber associated with an AP, and/or other information such as specific action, service, or information requests.

An action 1202 comprises sending a reply to the requesting AP. The reply contains information and/or messaging that is responsive to the received query, such as targeted messaging, notifications, or other information.

Figure 13:
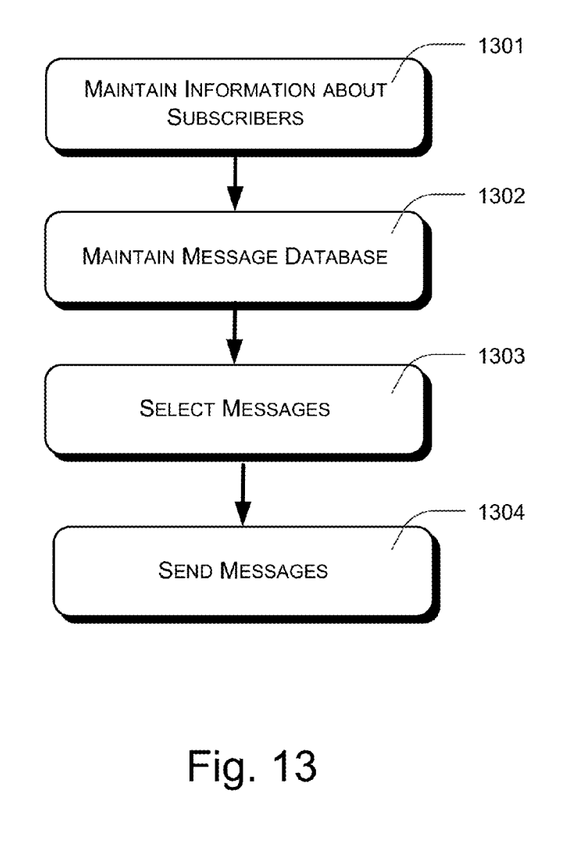
FIG. 13 illustrates actions that can be performed in a second embodiment by messaging service in response to requests from one or more of APs.

FIG. 13 illustrates actions that can be performed by messaging service 105 in a second embodiment. An action 1301 comprises maintaining information about service subscribers that are associated with particular APs. An action 1302 comprises maintaining a message database containing targeted messaging for potentially supplying to different APs.

An action 1303 comprises, for a particular AP, selecting a set of messages that are to be targeted to that particular AP. This selecting is based on the AP information maintained by messaging service 105 and corresponding known targeting information associated with the messages of the message database.

An action 1304 comprises sending the set of messages to the particular AP, for subsequent distribution to mobile devices that request targeted information from the AP.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of providing targeted messaging from a network of wireless access points associated respectively with various service subscribers, comprising:

identifying a first group of one or more wireless access points and a second group of one or more wireless access points;

determining whether a message provider has chosen to access at least one of the first group of one or more wireless access points or the second group of one or more wireless access points, access to the first group of one or more wireless access points provided in exchange for a first fee when the first group of one or more wireless access points is chosen and access to the second group of one or more wireless access points provided in exchange for a second fee when the second group of one or more wireless access points is chosen;

for a particular wireless access point in the first group of one or more wireless access points or the second group of one or more wireless access points, identifying one or more messages associated with the message provider, the identifying based at least in part on attributes of one or more service subscribers associated with the particular wireless access point through a service provider or a messaging service, the one or more service subscribers providing services to one or more users of one or more wireless devices;

receiving a probe request frame from a particular wireless device, the probe request frame containing an information element that specifies a request for a targeted message; and providing at least one of the one or more messages to the particular wireless device in response to the request for the targeted message.

2. The method as recited in claim 1, wherein the attributes of the one or more service subscribers comprise one or more of the following:

a business type;

a location; and a customer type.

3. The method as recited in claim 1, wherein the service provider includes a messaging database that is a source of the one or more messages.

4. The method as recited in claim 1, further comprising:

providing a probe response frame from the particular wireless access point to the particular wireless device in response to the request for the targeted message, the probe response frame indicating at least one of the one or more messages.

5. The method as recited in claim 1, further comprising:

receiving at least one of the one or more messages at the particular wireless device;

filtering the received one or more messages in accordance with user preferences; and rendering the filtered one or more messages to a user of the particular wireless device.

6. The method as recited in claim 1, further comprising:

receiving at least one of the one or more messages at the particular wireless device;

validating that the received one or more messages originated from an authorized source; and rendering the validated one or more messages to a user of the particular wireless device.

7. The method as recited in claim 1, wherein the information element specifies one or more service providers to provide the one or more messages.

8. The method as recited in claim 1, wherein the service provider is an Internet provider through which individual consumers obtain Internet data service.

9. A method of providing targeted messaging to a wireless device comprising:

identifying a first group of one or more wireless access points and a second group of one or more wireless access points;

determining whether a message provider has chosen to access at least one of the first group of one or more wireless access points or the second group of one or more wireless access points, access to the first group of one or more wireless access points provided in exchange for a first fee when the first group of one or more wireless access points is chosen and access to the second group of one or more wireless access points provided for a second fee when the second group of one or more wireless access points is chosen;

receiving a probe request, the probe request containing an information element that specifies one or more characteristics or interests of a user of the wireless device;

receiving a request for one or more targeted messages in accordance with the one or more characteristics or interests of the user of the wireless device;

in response to receiving the request for one or more targeted messages, identifying one or more messages associated with the message provider, the one or more identified messages targeted to the user of the wireless device based on the one or more characteristics or interests of the user of the wireless device; and transmitting a response to the request for one or more targeted messages, the response indicating the one or more identified messages.

10. The method as recited in claim 9, wherein:

the probe request indicates presence of the wireless device; and the one or more identified messages comprise a notification to the wireless device of an event.

11. The method as recited in claim 9, wherein identifying the one or more messages that are targeted to the user comprises referencing characteristics or interests of the user that are specified in the probe request.

12. The method as recited in claim 9, wherein identifying the one or more messages targeted to the user of the wireless device includes correlating descriptive tags of the one or more messages with the one or more characteristics or interests of the user of the wireless device.

13. The method as recited in claim 9, wherein the response comprises a probe response frame.

14. The method as recited in claim 9, wherein the response comprises a beacon frame.

15. A system for providing targeted messages to mobile wireless devices, comprising:
- one or more processors;
- a computer storage media including computer-readable instructions executable by the one or more processors to:
- receive an indication from a message provider specifying at least one of a first group of wireless access points associated with a first fee or a second group of wireless access points associated with a second fee from a network of wireless access points to provide the targeted messages;
- receive an indication of a presence of a particular mobile wireless device proximate to at least one of the wireless access points;
- for a particular wireless access point of the first group or the second group, identifying one or more targeted messages associated with a message provider, the identifying based at least in part on attributes of one or more service subscribers associated with the particular wireless access point through a service provider or a messaging service;
- obtain the one or more targeted messages from a notification service that are targeted to the particular mobile wireless device; and
- transmit the one or more obtained targeted messages for reception by the particular mobile wireless device.

16. The system as recited in claim 15, wherein the computer-readable instructions are further executable by the one or more processors to:
- select a first group of one or more wireless access points from the network of wireless access points operated by or within a business premises of an advertiser or a message provider based on a first fee paid by the advertiser or the message provider;
- select a second group of one or more wireless access points from the network of wireless access points that are adjacent to the first group of one or more access points based on a second fee paid by the advertiser or the message provider, the second fee being higher than the first fee; and
- select a third group of one or more wireless access points from the network of wireless access points that across different locations based on a third fee paid by the advertiser or the message provider, the third fee being higher than the second fee.

17. The system as recited in claim 15, wherein the one or more obtained targeted messages are transmitted from the particular wireless access point in a beacon frame.

18. The system as recited in claim 15, wherein the one or more obtained targeted messages are transmitted from the particular wireless access point in a probe response frame.

19. The system as recited in claim 15, wherein the one or more obtained targeted messages are transmitted from the particular wireless access point in a beacon frame, for reception by the particular mobile wireless device regardless of whether the particular mobile wireless device joins the particular wireless access point.

20. The system as recited in claim 15, wherein receiving the indication of the presence of the particular mobile wireless device comprises receiving an information element that indicates the presence of the particular mobile wireless device.

* * * * *